INVENTOR.
Howard E. Bussey

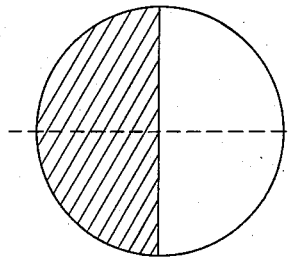
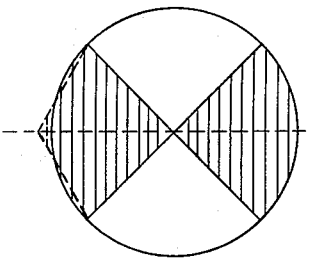
Fig. 3.  Fig. 4.
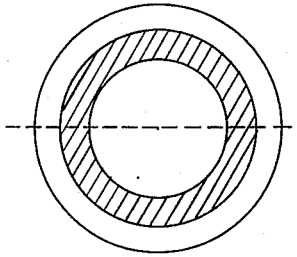
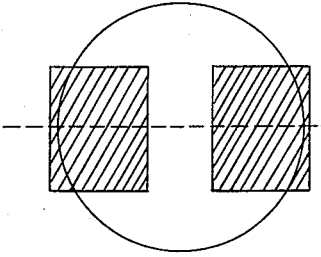
Fig. 5.  Fig. 6.
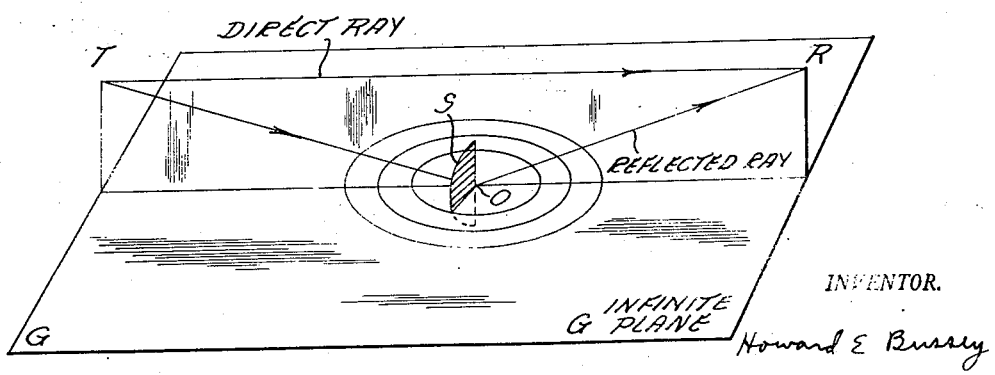
Fig. 8.
INVENTOR.
Howard E. Bussey

United States Patent Office 2,763,001
Patented Sept. 11, 1956

2,763,001

REFLECTED-RAY ELIMINATORS

Howard E. Bussey, Silver Spring, Md., assignor to the United States of America as represented by the Secretary of Commerce Application November 28, 1951, Serial No. 258,735

7 Claims. (Cl. 343—841)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

The present invention relates to a new wave-suppressing technique and in particular to wave suppression by means of Fresnel zone screening. The present techniques are particularly applicable in the field of line-of-sight wave transmission. The users of line-of-sight microwave communications are often confronted with service interruptions resulting from interference due to ground reflection effects. Although the receiver may be originally located at a point such that the ground-reflected wave will reinforce the direct wave, atmospheric changes may shift the spatial relation of the two waves causing them to arrive at the receiver out of phase, thereby causing destructive interference. This variation between a maximum and a minimum signal will cause fading of the transmitted signal which can be very troublesome particularly in systems used for relaying television signals. Several methods such as diversity reception have been used in order to eliminate this difficulty but these require the use of two antennas which are vertically spaced from each other. Consequently these systems are very expensive and difficult to install and maintain.

As stated above, the techniques of the present invention are applicable to line-of-sight wave transmission. This is not limited to microwave transmission but is useful in the transmission of light waves or, as indicated, in any line-of-sight transmission of electromagnetic waves or sound waves.

The primary object of the present invention is to eliminate interference from ground-reflected waves in line-of-sight transmission practice.

Another object is to eliminate interference from ground-reflected waves in microwave transmission paths by means of a metal screen placed on the ground at the point of geometrical reflection of the central ray from the transmitter to the receiver.

Another object of the present invention is to eliminate interference from a ground-reflected wave by producing a null region in the reflected wave about the receiver.

Another object of the present invention is to produce a null region at any receiver of electromagnetic or sound waves by placing a screen of the proper size and shape between the transmitter and receiver in order to suppress the direct wave.

In accordance with the present invention either a direct or a reflected wave can be suppressed at the receiving point of the wave by interposing an opaque screen of the proper size and shape at a predetermined point in the transmission path. The screen in most cases will cover a portion of the first Fresnel zone only, but in some cases may extend into the second Fresnel zone.

The screens used as indicated must be opaque; that is, they must not pass the wave, whether it is a light, radio, or sound wave.

Other uses and advantages of the invention will become apparent upon reference to the specification and drawings.

Figures 3, 4, 5, and 6 are views of different shaped screens used for wave suppression.

Figure 1:
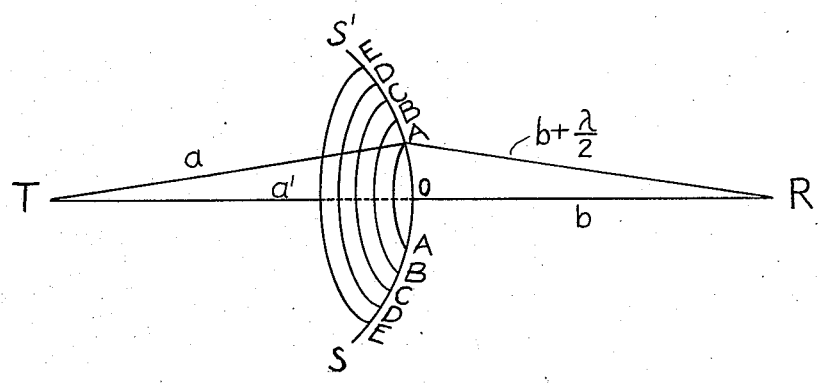
Figure 1 is a view showing the breakdown of a wave front into Fresnel zones.
Figure 7:
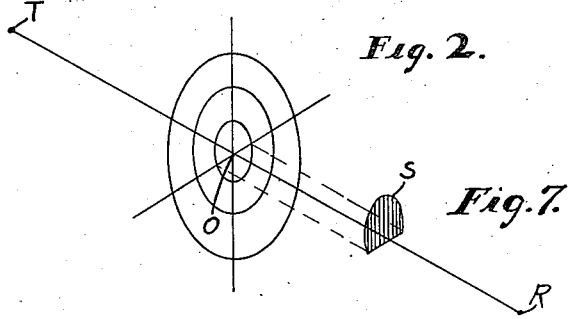

Figure 7 is an isometric view illustrating the theory shown in connection with Figure 1.

Figure 2:
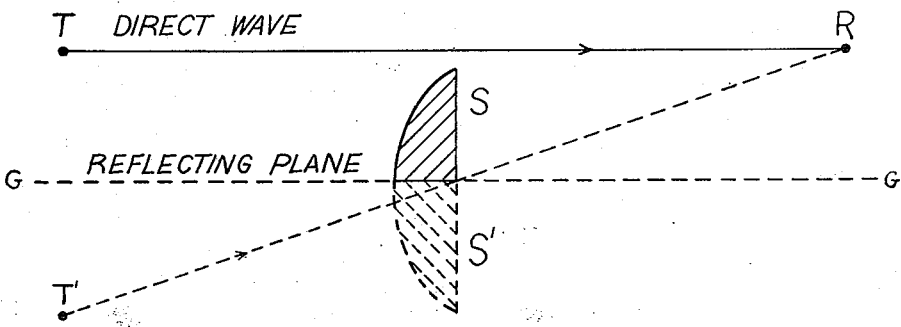
Figure 2 is a view used to explain the image theory in reflected wave suppression.

Figure 8 is an isometric view illustrating the theory shown in connection with Figure 2.

The present invention applies the theories of Huygens and Fresnel to the solution of problems in the field of line-of-sight wave transmission.

The Huygens-Fresnel principles are demonstrated by means of Figure 1. Referring to Figure 1, point T is an emitter of electromagnetic waves and point R is the receiver. The surface SS' represents a section of a spherical wave front showing the waves spreading out from the transmitter T. Since SS' is a spherical surface with its center at T, the points O, A, B, C, and D are all equidistant from T. The wave front SS' is divided into zones called Fresnel zones by choosing points A, B, C, D, and E, so that each point is a half wave length further from R than the preceding point. The point O is chosen so that TOR is the shortest distance from T to R. Therefore if the distance from O to R is $b$, then A to R is $b+\lambda/2$, B to R is $b+2\lambda/2$, etc. By Huygens' principle every point on the spherical surface is a source of secondary wavelets, all of these secondary sources being in phase at their origin since they are all equidistant from the transmitter T. As received at R the phases of the secondary wavelets from a single zone differ at the most by 180° and therefore the resultant of each zone may be taken to have a definite phase halfway between the two extremes. Since each zone is therefore an average of half a wave length further from R than the next succeeding zone, the waves from zone OA will be in phase with those from BC but out of phase with those from AB and CD. It can be seen therefore that the amplitude of the signal received at the receiver R is the vector sum of the waves originating in the different Fresnel zones. If the zones are allowed to approach an infinite number, which is very nearly true in actual practice, it can be shown analytically that the total amplitude of the resultant wave at R is equal to one half the amplitude of the signal emitted from the first Fresnel zone.

This fact can be utilized to create null areas at the receiver R by interposing opaque screens of specified sizes and shaped between the transmitter and receiver. Since the resultant amplitude at the point R is equal to one half the amplitude of the wave emitted from the first Fresnel zone it is possible to produce a null at the receiver if an opaque screen in the shape of a semicircle and with a radius equal to that of the first Fresnel zone is used to block off half of the first Fresnel zone of the transmission path between the transmitter and receiver. While the immediate object of the present invention is to minimize the interference by reflected ray suppression, the more easily visualized case of direct ray suppression as symbolized in Fig. 7 will first be described. In this figure, T represents a wave source, transmitting wave energy to a receiver at R. The half-period or Fresnel zones associated with the wave front is symbolized by the series of concentric areas appearing on a reference plane located at O and which is perpendicular to the central ray TR. These Fresnel zones are bounded by successive concentric circles of particular radii with their centers at point O.

Should the first Fresnel zone represented by the inner circle in Fig. 7 be obturated by an opaque screen S which may be of semicircular configuration, then the wave field at point R will be zero, even though only a small area of the wave has been blocked. That is, almost the entire wave front will arrive at R, but in such manner as to cancel itself by destructive interference. The important criteria is that the wave amplitude contributed by the first zone be halved without changing the phase of the resultant wave from the referred to first zone. As will be shown later, the shape of the screen is not restricted to a semicircle. This screen will reduce the amplitude of the wave due to the first Fresnel zone to one half and therefore the resultant at the receiver will be zero, since the remaining bare portion of the first zone will have its effects cancelled by waves from all successive Fresnel zones.

This then makes it possible to produce a complete null at the receiver by merely blocking half of the first Fresnel zone. The formula for finding the radius of the first zone is:

$$r = \sqrt{ab\lambda/(a+b)} \quad (1)$$

where $a$ is the distance from the transmitter to the wave front, $b$ is the distance from the wave front to the receiver, and $\lambda$ is the wave length of the carrier wave.

This formula is only approximate but it gives very good results when $a$ and $b$ are large compared with $\lambda$. This is always the case in microwave relay systems.

This invention is particularly applicable to the suppression of ground-reflected waves in the microwave transmission field, as shown in Figs. 2 and 8. In this case a screen is erected at the point of geometrical reflection, on the ground G-G, of a ray transmitted from T to R. The plane of the screen is perpendicular to the ground and to the line joining the transmitter and receiver as is more clearly shown in Fig. 8. In Fig. 8, the Fresnel zones are depicted at O, the direct ray is indicated by T-R while the reflected ray between the source T and receiver R is shown as T-O-R. An opaque screen S in the shape of a quarter sector of a curve is employed as a vertical baffle on the ground plane G-G at the point O where the reflected ray touches the ground plane.

If the radius of such sector is determined by the referred to Equation 1 generally characterizing the first Fresnel zone, then the reflected ray will have zero amplitude at the receiving point B which may be regarded as the first point of interest. However, the region of nearly zero field is large enough to cover the receiving antenna for the geometrics normally encountered in practical microwave relay link. In terms of image theory the plane of the screen is located where the ray from the image transmitter would intersect the ground surface in going straight to the receiving point as shown in Fig. 2.

In Figure 2, T is again the transmitter and R the receiver. The line G-G represents the surface of the earth and S the zonal screen as shown in Fig. 8. T' is the image transmitter and S' is the image screen. The field above the plane is the vector sum of the amplitudes from T and T', each diffracted around the double screen SS'. That is, the amplitude at the point R is $$A_R = D + D' \quad (2)$$

where D and D' are respectively the diffracted fields from T and T' in this modified problem.

The purpose of this invention, then, is to make $A_R$ equal to the free space field $A_{fs}$ expected from T; i. e., to make $$D + D' = A_{fs} \quad (3)$$

It is seen incidentally that the total effect of the screen and ground $(D+D'-A_{fs})$ cannot be represented by the single source T' in general, as was the case in the simple image theory without a screen. It is found from diffraction calculations that D tends toward the value $A_{fs}$ very quickly if the point R is outside of the main diffraction shadow of T cast by SS'. Figure 2, showing the direct ray to R barely clear of the screen is a typical situation and one in which P is already well outside of the main shadow. This being the case, the problem of suppressing the reflected wave is approximately solved by making D' vanish. D' vanishes, for example, if S is a quarter circle placed correctly so that the double screen SS' is a blocking semicircle for T' as was described in the theory above for eliminating a source in free space. The quarter circle (or other suitable screen, see Figures 3, 4, 5, etc.) must be placed at the point of geometrical reflection of a ray from T to R, for it is only here that SS' is properly located in the first zone of the virtual Fresnel zones associated with the propagation from T' to R. The screen should be set up vertically and its vertical dimensions multiplied by the secant of the small grazing angle of the reflected ray in order to nullify exactly the required portion of the zone. This has the effect of stretching the screen dimension in the vertical by a certain percentage.

The (usually small) difference, $D-A_{fs}$, may be called a remaining reflection, since it always remains regardless of whether D' is made to vanish.

The reflected wave may be eliminated by another method, akin to zonal screening. Some ellipses may be delineated on the ground so that they define half-period zones. If either (a) half of the first such zone were non reflecting, (b) all of it were 50 percent reflecting, or (c) a quarter sector of it were to change the phase of its reflection by 180 degrees, then the reflected wave ought to disappear at the receiving point. This type of approach might be used to reduce "multi-path" reflections from buildings. A phase change of 180 degrees over a quarter sector of a Fresnel zone in free-space transmission would also constitute a zonal screen.

So far only screens which form a sector of a circle have been described in the explanation; this was for convenience. However, the useful screens are not limited to this shape only. Other shapes have been used and some of these are shown in the Figures 3 to 6. In these figures the outer circle in each case represents the outer perimeter of the first Fresnel zone and the dotted horizontal line represents the ground plane in reflected ray applications. Therefore during reflected ray suppression all of the screen below the dashed lines is naturally omitted; only the screen area above the dashed line is necessary. All of these screens have been designed for complete suppression.

Figure 3 shows the use of the half circle for direct rays and quarter circle (90° sector) for reflected rays.

Figure 4 shows that it is possible to cut the half circle into sectors and still get complete suppression. This shows also that it does not matter which half of the circle is eliminated. The results are still the same.

Figure 5 shows an annular ring screen which produces complete suppression, although it nullifies only one-third of the area of the first zone. It is located in the middle phases of the zone where the screening action is most efficient.

Figure 6 shows perhaps the most convenient screen from a structural point of view. This is formed of two rectangles and can easily be built in the field. It is a necessary requirement in this rectangular design that a small portion of the screen extend into the second Fresnel zone. The suppression produced by this configuration gives a desirable broad null area.

An approximate formula for the radius of main suppressed null area is:

$$R = \tfrac{1}{10}\sqrt{b\lambda(a+b)/a}$$

For example in a typical microwave relay transmission path R is about 10 feet. This null is large enough to cover an antenna 20 feet in diameter. In work with light the null would be apparent as a black spot in the middle of a bright area.

The screens used for work with applied light would, of course, be opaque. The screens used for microwave work would be electrically opaque; that is, they would prevent any transmitted waves from getting through. Copper wire mesh screens would be suitable for this purpose.

It will be apparent that the embodiments shown are only exemplary and that various modifications can be made in construction and arrangement within the scope of my invention as defined in the appended claims.

I claim:

1. A method of producing a null region about a receiver of transmitted waves which consists of placing an opaque semicircular disk with a radius equal to the radius of the first Fresnel zone in the first Fresnel zone of the wavefront of said transmitted wave between the transmitter and receiver of said transmitted waves.

2. A method for producing a null region about a receiver of transmitted waves that consists of placing two rectangular opaque screens between the transmitter and receiver of said transmitted waves, said rectangular screens covering substantially more of the first Fresnel zone of the wavefront of said transmitted wave than the second Fresnel zone.

3. In a line-of-sight transmission system comprising a transmitter and a receiver, a direct and a ground-reflected wave and means for suppressing said ground-reflected wave that consists of a noncircular opaque screen placed in only a portion of the first Fresnel zone of the wavefront of said reflected wave at the point of geometrical reflection of the central ray from the transmitter to the receiver.

4. The invention according to claim 3 in which the screen consists of two one-eighth sectors of a circle.

5. In a line-of-sight transmission system comprising a transmitter and a receiver, a direct and a ground-reflected wave and means for suppressing said ground-reflected wave that consists of two rectangular opaque screens placed in a portion of the first and second Fresnel zones of the wavefront of said ground reflected wave, said screens covering substantially more of the first zone than the second zone.

6. In a microwave transmission system, a transmitter, a receiver, a direct microwave, and a ground-reflected microwave, and means for producing a null region in the reflected wave about the receiver, said means consisting of two rectangular opaque screens placed at the point of geometric reflection from the ground of the central ray of the wave in a portion of the first and second Fresnel zones of the wavefront of said ground reflected microwave, said screens covering substantially more of the first zone than of the second zone.

7. In a line of sight wave transmission system, a transmitter, a receiver, and an opaque semicircular screen having a radius equal to the radius of the first Fresnel zone of the wavefront of the transmitted wave, said screen being located between said transmitter and said receiver so as to intercept a portion of the first Fresnel zone only.

References Cited in the file of this patent

UNITED STATES PATENTS

| | | |
|---|---|---|
| 2,103,357 | Gerhard | Dec. 28, 1937 |
| 2,287,550 | Carter | June 23, 1942 |
| 2,396,096 | Goldstine | Mar. 5, 1946 |
| 2,510,947 | Baker | June 13, 1950 |
| 2,553,166 | Bond | May 15, 1951 |
| 2,601,346 | Valensi | June 24, 1952 |

FOREIGN PATENTS

| | | |
|---|---|---|
| 122,588 | Australia | Nov. 7, 1946 |

OTHER REFERENCES

"The Theory of Optics" by Paul Drude; Longmans, Green, and Co., New York, N. Y.; published 1907; pages relied on are 162–169.